(12) United States Patent
Takishita et al.

(10) Patent No.: US 9,299,968 B2
(45) Date of Patent: Mar. 29, 2016

(54) WIRE ARRANGING DEVICE

(71) Applicant: Yazaki Corporation, Tokyo (JP)

(72) Inventors: Ryuta Takishita, Kakegawa (JP);
Yukihisa Kikuchi, Kakegawa (JP);
Masaru Imai, Kakegawa (JP); Keizo Aoki, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 133 days.

(21) Appl. No.: 14/314,533

(22) Filed: Jun. 25, 2014

(65) Prior Publication Data

US 2014/0308560 A1    Oct. 16, 2014

Related U.S. Application Data

(63) Continuation of application No. PCT/JP2013/055267, filed on Feb. 21, 2013.

(30) Foreign Application Priority Data

Feb. 23, 2012  (JP) .................................. 2012-037859

(51) Int. Cl.
*H01M 2/20* (2006.01)
*H01M 10/48* (2006.01)
*H01M 10/42* (2006.01)

(52) U.S. Cl.
CPC ............ *H01M 2/206* (2013.01); *H01M 10/482* (2013.01); *H01M 2010/4278* (2013.01)

(58) Field of Classification Search
None
See application file for complete search history.

(56) References Cited

U.S. PATENT DOCUMENTS

| 2012/0171908 | A1 | 7/2012 | Henmi |
| 2012/0322320 | A1 | 12/2012 | Takase et al. |
| 2012/0328920 | A1 | 12/2012 | Takase et al. |

FOREIGN PATENT DOCUMENTS

| JP | 2010-170884 A | 8/2010 |
| JP | 2011-70846 A | 4/2011 |
| JP | 2011-91003 A | 5/2011 |
| WO | 2011/037268 A2 | 3/2011 |
| WO | 2011/108511 A1 | 9/2011 |
| WO | 2011/111678 A1 | 9/2011 |

OTHER PUBLICATIONS

International Search Report, dated May 27, 2013, issued by the International Searching Authority in counterpart International Application No. PCT/JP2013/055267.
Written Opinion, dated May 27, 2013, issued by the International Searching Authority in counterpart International Application No. PCT/JP2013/055267.
Office Action dated Jan. 19, 2016, issued by the Japanese Intellectual Property Office in counterpart Japanese Application No. 2012-037859.

*Primary Examiner* — Jonathan Crepeau
(74) *Attorney, Agent, or Firm* — Sughrue Mion, PLLC

(57) ABSTRACT

A wire arranging device includes bus bars each interconnecting a plus and a minus terminal, in a first and a second terminal row, a first and a second row of bus bar containing rooms in which the bus bars are individually contained, a first and a second tray part respectively connected to the first and the second row of the bus bar containing rooms stacked on each other, first wires of which one ends are connected to the bus bars of the first row and placed on the first tray part, while the other ends are connected to a first connector at a second terminal row side, and second wires of which one ends are connected to the bus bars of the second row and placed on the second tray part, while the other ends are connected to a second connector at a first terminal row side.

3 Claims, 7 Drawing Sheets

WIRE ARRANGING DEVICE

CROSS REFERENCE TO RELATED APPLICATIONS

This application is a continuation of PCT application No. PCT/JP2013/055267, which was filed on Feb. 21, 2013 based on Japanese Patent Application (No. 2012-037859) filed on Feb. 23, 2012, the contents of which are incorporated herein by reference.

BACKGROUND OF THE INVENTION

1. Field of the Invention

The present invention relates to a wire arranging device which is favorably used in an electric car provided with a battery.

2. Description of the Related Art

In an electric car which is driven using an electric motor, a hybrid car which is driven using both an engine and an electric motor, and so on, a power supply device is mounted as a driving source for the electric motor. This power supply device includes a battery assembly which is so constructed that a plurality of batteries each provided with a positive electrode (a plus terminal) at one end, and a negative electrode (a minus terminal) at the other end are superposed on one another alternately in opposite directions, and a wire arranging device (or a bus bar module) which is mounted on this battery assembly (see, for example,).

FIG. 5 is a plan view of an essential part of a conventional wire arranging device, and FIG. 6 is a plan view of a battery assembly provided with the conventional wire arranging device.

As shown in FIG. 5, a wire arranging device 501 is formed by plastic molding, as a whole, and includes voltage detecting wire containing parts 503, a terminal containing room 509 for containing plus terminals 505 and minus terminals 507 of batteries, and voltage detecting wire guiding parts 511 for interconnecting the voltage detecting wire containing parts 503 and the terminal containing room 509 (see, for example,).

The terminal containing room 509 is an assembly including a plurality of containing chambers 513, and has a box-like shape in which respective upper faces of the containing chambers 513 are opened. Each of the containing chambers 513 is formed with a plus terminal hole 515 for rendering the plus terminal 505 of the battery to pass it through, and a minus terminal hole 517 for rendering the minus terminal 507 of the adjacent battery to pass it through, in a bottom part thereof.

In a battery assembly 519, the plus terminal 505 and the minus terminal 507 are coupled by means of a bus bar 521 which is formed of an electrically conductive metal plate, thereby to form a circuit for connecting the battery and the adjacent battery in series. In the same manner, the plus terminals 505 and the minus terminals 507 in all the other terminal containing rooms 509 are coupled by means of the bus bars 521, thereby to form circuits for connecting all the batteries in series, and high direct current voltage can be obtained.

In the wire arranging device 501, voltage detecting wires 525 are connected to the bus bars 521 in the respective containing chambers 513 by way of voltage detecting terminals 523. For the purpose of guiding out the voltage detecting wire 525 per each of the batteries, the voltage detecting wire guiding part 511 is formed between the voltage detecting wire containing part 503 and the terminal containing room 509. The voltage detecting wire 525 is arranged in this voltage detecting wire guiding part 511 so as not to be directly contacted with the other voltage detecting wires 525.

The voltage detecting wire guiding part 511 of the containing chamber 513 which is the nearest to a first connector 527, out of a plurality of the containing chambers 513, is connected to the voltage detecting wire containing part 503 which is the nearest to this containing chamber 513, out of a plurality of the voltage detecting wire containing parts 503. Then, the voltage detecting wire guiding part 511 of the containing chamber 513 which is the second nearest to the first connector 527 is connected to the voltage detecting wire containing part 503 which is the second nearest to this containing chamber 513. By repeating this, a plurality of the voltage detecting wires 525 are orderly arranged from the terminal containing room 509 to the voltage detecting wire containing parts 503, without crossing one another.

As shown in FIG. 6, the battery assembly 519 includes a pair of a first terminal row 529 and a second terminal row 531 in parallel, in which the plus terminals 505 and the minus terminals 507 of the batteries are alternately arranged. In the first terminal row 529 and the second terminal row 531, a set of the plus terminal 505 and the adjacent minus terminal 507 are connected by means of the above described bus bar 521. In the wire arranging device 501 which is provided on the first terminal row 529, the voltage detecting wires 525 are connected to the first connector 527 located near the first terminal row 529, and in the wire arranging device 533 which is provided on the second terminal row 531, the voltage detecting wires 525 are connected to the second connector 535 located near the second terminal row 531. The first connector 527 and the second connector 535 are connected to a battery monitoring unit, which is not shown, thereby to transmit voltage data of the respective bus bars 521.

CITATION LIST

Patent Literature

[PTL 1] Japanese Patent Publication No. JP-A-2010-170884

[PTL 2] Japanese Patent Publication No. JP-A-2011-70846

In the conventional wire arranging devices 501 and 533, the voltage detecting wires 525 which are respectively contained in the voltage detecting wire containing parts 503 interfere with each other, but they are simply overlapped in parallel, as shown in FIGS. 7A and 7B. Therefore, a load caused by tension and friction of the wires in a direction of arrow marks in the drawings is small.

By the way, it is desired, in some cases, to dispose the first connector 527 near the second terminal row 531, and the second connector 535 near the first terminal row 529, depending on a layout of the batteries, a wiring board of the battery monitoring unit, etc. In such an arrangement, it is considered that the voltage detecting wires 525 which are respectively connected to the first terminal row 529 and the second terminal row 531 are contained in a common voltage detecting wire containing part, and thereafter, the voltage detecting wires 525 are respectively connected to the corresponding second connector 535 and the first connector 527. However, in this case, the voltage detecting wires 525 cross (intersect) each other inside the voltage detecting wire containing part, as shown in FIG. 7C, and loads caused by contact friction or the like may be concentrated on one point. As the results, there is such possibility that coverings of the wires may be damaged through a long time use.

SUMMARY OF THE INVENTION

The invention has been made in view of the above described circumstances, and it is an object of the invention to provide a wire arranging device in which wires connected to a first terminal row and wires connected to a second terminal row can be respectively guided out toward the second terminal row and toward the first terminal row at opposite sides, without being contacted with each other.

The above described object of the invention can be achieved by the following structure.

(1) A wire arranging device, comprising a plurality of bus bars for interconnecting plus terminals and minus terminals of batteries which are alternately disposed in a pair of a first terminal row and a second terminal row arranged in parallel with each other, each of the bus bars interconnecting a set of the plus terminal of each of the batteries and the minus terminal of the adjacent battery, a first row of bus bar containing rooms and a second row of bus bar containing rooms in which the bus bar containing rooms are continued, the bus bar containing rooms being defined to respectively contain the bus bars, a first tray part and a second tray part which are respectively connected to the first row of the bus bar containing rooms and the second row of the bus bar containing rooms, and stacked on each other, a plurality of first wires, wherein one ends of the first wires are respectively connected to the bus bars of the first row of the bus bar containing rooms and placed on the first tray part, while the other ends of the first wires are guided out toward one end side in a terminal arranging direction of the second terminal row and connected to a first connector, and a plurality of second wires, wherein one ends of the second wires are respectively connected to the bus bars of the second row of the bus bar containing rooms and placed on the second tray part, while the other ends of the second wires are guided out toward one end side in a terminal arranging direction of the first terminal row and connected to a second connector.

According to the wire arranging device having the structure as described above in (1), the respective bus bars interconnecting the plus terminals and the minus terminals in the first terminal row are connected to the first wires. These first wires are guided out from the respective bus bar containing rooms of the first row of the bus bar containing rooms and placed on the first tray part. A plurality of the first wires which are placed on the first tray part are bundled at a side of the second terminal row on the first tray part to be guided out from an end edge of the first tray part, and can be connected to the first connector which is disposed at one end in a direction where the terminals of the second terminal row are arranged. On the other hand, the respective bus bars interconnecting the plus terminals and the minus terminal of the second terminal row are connected to the second wires. These second wires are guided out from the respective bus bar containing rooms of the second row of the bus bar containing rooms and placed on the second tray part. A plurality of the second wires which are placed on the second tray part are bundled at a side of the first terminal row on the second tray part to be guided out from an end edge of the second tray part, and can be connected to the second connector which is disposed at one end in a direction where the terminals of the first terminal row are arranged. Specifically, the first wires guided out from the first row of the bus bar containing rooms, and the second wires guided out from the second row of the bus bar containing rooms are respectively placed on the first tray part and the second tray part which are stacked on each other. Therefore, even though guiding out positions of the first wires and the second wires are exchanged with each other, by arranging the first wires at a side of the second terminal row and the second wires at a side of the first terminal row, the wires will not intersect nor come into contact with each other.

(2) The wire arranging device as described in the above (1), wherein partition walls for forming wire arranging grooves for the first wires are uprightly provided on the first tray part, and partition walls for forming wire arranging grooves for the second wires are uprightly provided on the second tray part.

According to the wire arranging device having the structure as described above in (2), the first wires on the first tray part and the second wires on the second tray part are respectively contained in the wire arranging grooves which are formed between the partition walls. As the results, it is possible to prevent intersections and contacts between the wires inside the respective trays.

(3) The wire arranging device as described in the above (1), wherein the first row of the bus bar containing rooms and the first tray part are assembled to form a first case, the second row of the bus bar containing rooms and the second tray part are assembled to form a second case, and a plurality of pairs of locking hooks and locking parts for fixing the first tray part and the second tray part in a stacked state are provided between the first case and the second case.

According to the wire arranging device having the structure as described above in (3), the first case in which the first wires are placed on the first tray part, and the second case in which the second wires are placed on the second tray part are fixed to each other, as an integral product having the stacked structure, by means of the locking hooks and the locking parts, without using an additional member. Moreover, in the second case on the lower stage, the second tray part is covered with the first tray part on the upper stage, and hence, a lid member can be omitted.

According to the wire arranging device of the invention, the first wires which are connected to the first terminal row and the second wires which are connected to the second terminal row can be respectively guided out toward the second terminal row and toward the first terminal row at the opposite sides, without being contacted with each other.

As the results, it is possible to favorably deal with layouts of the batteries having various patterns, and structures of wiring boards for a battery monitoring unit or the like, and it is possible to select measures for cost reduction of the battery assembly from a wide range of choice.

The invention has been briefly described hereinabove. The invention will be further clarified, by reading through a mode for carrying out the invention (hereinafter referred to as "an embodiment") in the following description, referring to the attached drawings.

DETAILED DESCRIPTION OF THE EXEMPLARY EMBODIMENTS

Figure 1:
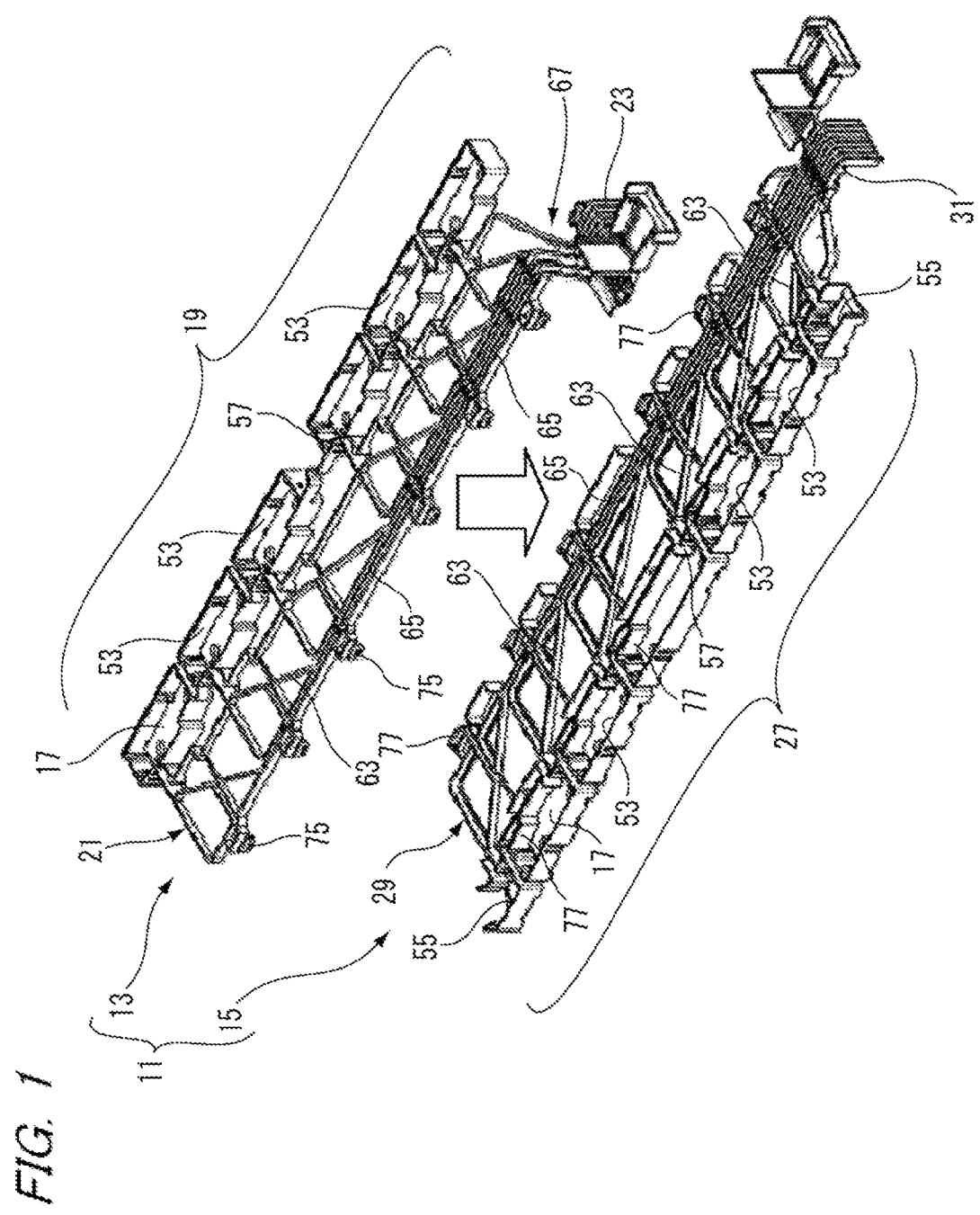
FIG. 1 is an exploded perspective view of a wire arranging device according to an embodiment of the invention.

Now, an embodiment according to the invention will be described referring to the drawings.

As shown in FIG. 1, a wire arranging device 11 in the embodiment includes a first case 13 and a second case 15. The first case 13 has bus bars 17, a first row 19 of bus bar containing rooms, a first tray part 21, a first connector 23, and first wires 25 (See FIG. 3). The second case 15 has the bus bars 17, a second row 27 of bus bar containing rooms, a second tray part 29, a second connector 31, and second wires 33 (See FIG. 4).

Figure 2:
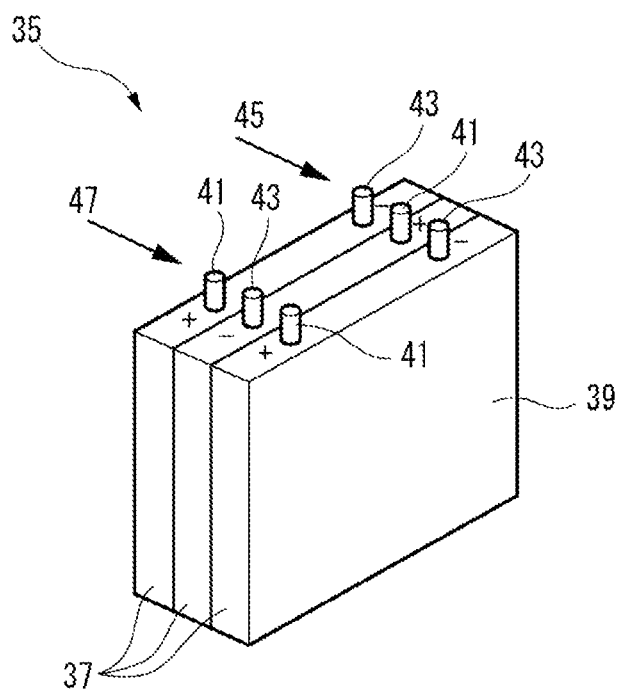
FIG. 2 is a perspective view of a battery assembly on which the wire arranging device in FIG. 1 is mounted.

The wire arranging device 11 is mounted on a battery assembly 35 as shown in FIG. 2, and supplies an electric power from the battery assembly 35 to an electric motor in an electric car which is driven using the electric motor, a hybrid car which is driven using both an engine and the electric motor, and so on.

The battery assembly 35 has a plurality of batteries 37, and a member for fixing these batteries 37 in a state stacked on one another. Each of the batteries 37 has a battery body 39 in a rectangular parallelepiped shape, and a pair of a plus terminal 41 and a minus terminal 43 which are respectively projected from one end and the other end of an upper face of this battery body 39. The plus terminal 41 and the minus terminal 43 are formed of electrically conductive metal into a columnar shape. In the battery assembly 35, a plurality of the batteries 37 are stacked on one another, alternately in opposite directions, in such a manner that the plus terminal 41 and the minus terminal 43 are positioned adjacent to each other.

A pair of a first terminal row 45 and a second terminal row 47 in which the plus terminals 41 and the minus terminals 43 are alternately arranged are formed in parallel, in the battery assembly 35. The plus terminals 41 and the minus terminals 43 in the first terminal row 45 and the second terminal row 47, which are adjacent to each other, are connected by a plurality of the bus bars 17 per each set of the plus terminal 41 and the minus terminal 43. In the same manner as in the conventional battery assembly, by connecting the plus terminals 41 and the minus terminals 43 by means of the bus bars 17, circuits for connecting the batteries 37 in series and the adjacent batteries 37 are formed in the battery assembly 35, and a high direct current voltage can be obtained.

Each of the bus bars 17 can be obtained, for example, by conducting a stamping work on a sheet metal having electrical conductivity. The sheet metal in a plate-like shape is provided with a pair of a plus terminal hole 49 and a minus terminal hole 51, through which the plus terminal 41 and the adjacent minus terminal 43 of the batteries 37 positioned adjacent to each other are passed. Nuts (not shown) are screwed over the plus terminal 41 and the minus terminal 43 which have been passed through the terminal holes, thereby to fix the bus bar 17 to the battery 37.

As shown in FIG. 1, these bus bars 17 are respectively contained in a plurality of bus bar containing rooms 53 in the first case 13, and a plurality of bus bar containing rooms 53 in the second case 15. Specifically, each of the bus bar containing rooms 53 contains a set of the plus terminal 41 and the minus terminal 43 which are passed it through, and also, the bus bar 17 for interconnecting them. The first row 19 of the bus bar containing rooms is formed in the first case 13, and the second row 27 of the bus bar containing rooms is formed in the second case 15. The bus bar containing rooms 53 for respectively containing the bus bars 17 are defined and continued in the first row 19 of the bus bar containing rooms and the second row 27 of the bus bar containing rooms. The first row 19 and the second row 27 of the bus bar containing rooms are formed in its entirety in a rectangular parallelepiped shape which is elongated in a direction where the bus bar containing rooms 53 are continued.

In the first row 19 and the second row 27 of the bus bar containing rooms, the adjacent bus bar containing rooms 53 are coupled by elastic coupling members 56 having hinge function (contraction/expansion). By adjusting an interval between the adjacent bus bar containing rooms 53, it is possible to absorb tolerance of a battery pitch.

Moreover, in this embodiment, a pair of single bus bar containing rooms 55 each containing only the plus terminal 41 or the minus terminal 43 are defined at both ends of the second row 27 of the bus bar containing rooms in the second case 15. The plus terminals 41 and the minus terminals 43 which are disposed in a pair of the single bus bar containing rooms 55 function as two poles of the connecting circuits in series in the battery assembly 35.

The first tray part 21 in a shape of a rectangular plate is attached to a side part of the first row 19 of the bus bar containing rooms in the first case 13, along a total length of the first row 19 of the bus bar containing rooms. Moreover, the second tray part 29 (See FIG. 1) in a shape of a rectangular plate is attached to a side part of the second row 27 of the bus bar containing rooms in the second case 15, along a total length of the second row 27 of the bus bar containing rooms.

The first tray part 21 and the second tray part 29 are respectively divided according to the corresponding bus bar containing rooms 53. The divided tray parts which are adjacent to each other are coupled by elastic coupling members 58 having hinge function (contraction/expansion). By adjusting an interval between the divided tray parts which are adjacent to each other, it is possible to absorb a tolerance of the battery pitch.

Figure 3:
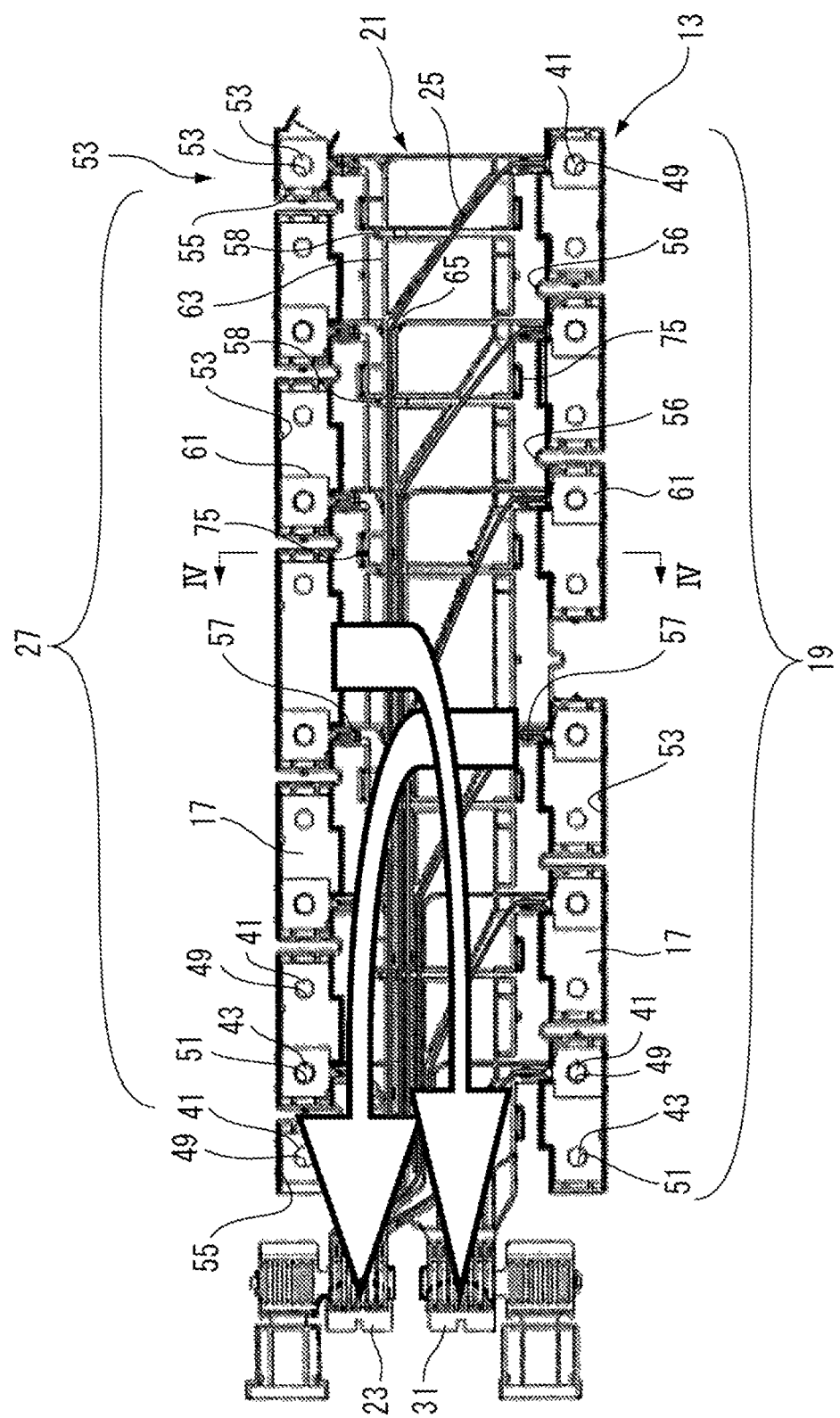
FIG. 3 is a plan view showing a manner of exchanging directions of the wires in the wire arranging device as shown in FIG. 1.

As shown in FIG. 3, the first tray part 21 and the second tray part 29 are stacked on each other. In this embodiment, the first tray part 21 is stacked on an upper stage, and the second tray part 29 is stacked on a lower stage. In the first case 13 and the second case 15 in which the first tray part 21 and the second tray part 29 are stacked, the first row 19 of the bus bar containing rooms and the second row 27 of the bus bar containing rooms are disposed at both sides interposing the first tray part 21 and the second tray part 29. Specifically, in a plan view, the first row 19 of the bus bar containing rooms and the first tray part 21 connected thereto (in short, an entirety of the first case 13) appear on the upper stage, and only the second row 27 of the bus bar containing rooms in the second case 15 appears outside the first tray part 21.

The bus bar containing rooms 53 of the first row 19 and the second row 27 are respectively provided with wire guiding parts 57. Each of the wire guiding parts 57 is formed in a shape of a rectangular box which is open upward, and allows an interior of the bus bar containing room 53 to communicate with the first tray part 21 or the second tray part 29.

By the way, each of the bus bar containing rooms 53 is provided with a voltage detecting terminal 61 which is formed of electrically conductive metal plate. The voltage detecting terminal 61 is formed in a square shape having a substantially half size of a bottom part of the bus bar containing room 53, and contained in the bottom part of the bus bar containing room 53. The voltage detecting terminal 61 is fixed integrally with the bus bar 17, by passing the plus terminal 41 or the minus terminal 43, which is disposed in the bottom part of the bus bar containing room 53, through a terminal passing hole formed in the voltage detecting terminal 61. The voltage detecting terminal 61 has a wire crimping part, and the first wire 25 or the second wire 33 which is a voltage detecting wire is fixed to this wire crimping part, by crimping.

In the battery assembly 35, resistive elements for preventing over current are not employed in the respective batteries 37. Alternatively, the first wires 25 or the second wires 33 are drawn from the respective batteries to be connected to the first connector 23 or the second connector 31, and then, the first wires 25 or the second wires 33 are connected in time division to a common resistive element for voltage detection which is mounted on a printed circuit (not shown) by way of the first connector 23 or the second connector 31. Comparing their currents in a CPU, whether or not the over currents flow from the respective batteries 37 is detected. In this manner, there is no necessity of providing the resistive elements for preventing the over current so as to correspond to the number of the batteries 37, and the cost is reduced.

However, for this purpose, the voltage detecting wires corresponding to the number of the batteries 37 are required. Naturally, in this case, for the purpose of preventing contacts and short-circuits between the wires, it is necessary to cover the respective wires with protecting material such as corrugated hoses or tubes, and further, to fix the wires by bundling their entirety with tapes or bands. In the wire arranging device 11 according to this embodiment, such measures are not at all employed, but the first wires 25 and the second wires 33 are arranged without being directly contacted with each other by means of the first tray part 21 and the second tray part 29. In this manner, a work for covering the respective wires with the protecting material such as the corrugated hoses or tubes is not necessary, and also, a work for bundling all the wires with the tapes or bands is not necessary. As the results, it is possible to achieve decrease of the number of working steps, reduction of the cost for the material, and saving of a wire arranging space.

The first wires 25 or the second wires 33 which are connected to the plus terminals 41 or the minus terminals 43 through the voltage detecting terminals 61 are guided out from the respective bus bar containing rooms 53 to the first tray part 21 or the second tray part 29 by way of the wire guiding parts 57. Respective one ends of a plurality of the first wires 25 are connected to the respective bus bars 17 in the first row 19 of the bus bar containing rooms, and placed on the first tray part 21, while their other ends are guided out to one end side in a terminal arranging direction of the second terminal row 47, and connected to the first connector 23. Moreover, respective one ends of a plurality of the second wires 33 are connected to the respective bus bars 17 in the second row 27 of the bus bar containing rooms, and placed on the second tray part 29, while their other ends are guided out to one end side in a terminal arranging direction of the first terminal row 45, and connected to the second connector 31.

Figure 4:
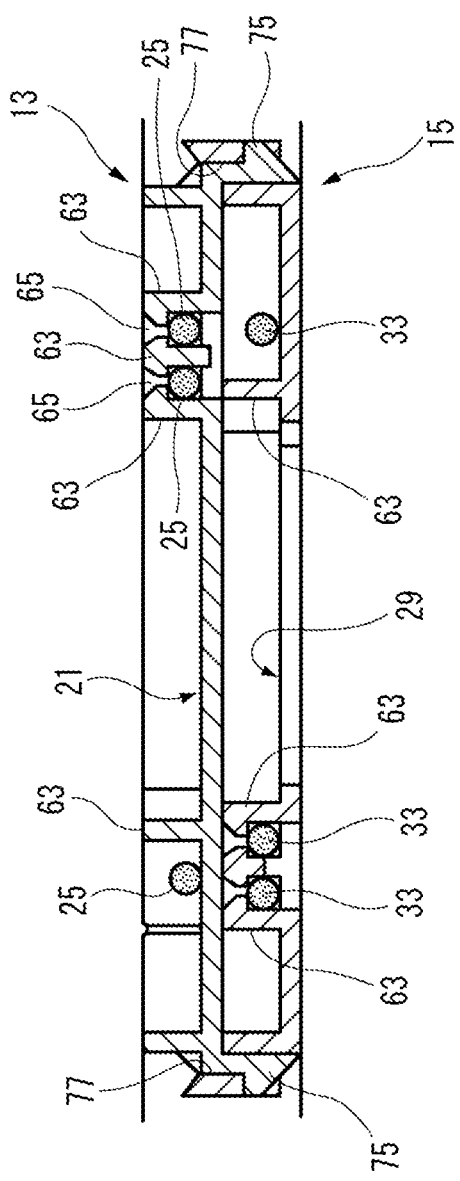
FIG. 4 is a sectional view taken along a line IV-IV in FIG. 3.
Figure 5:
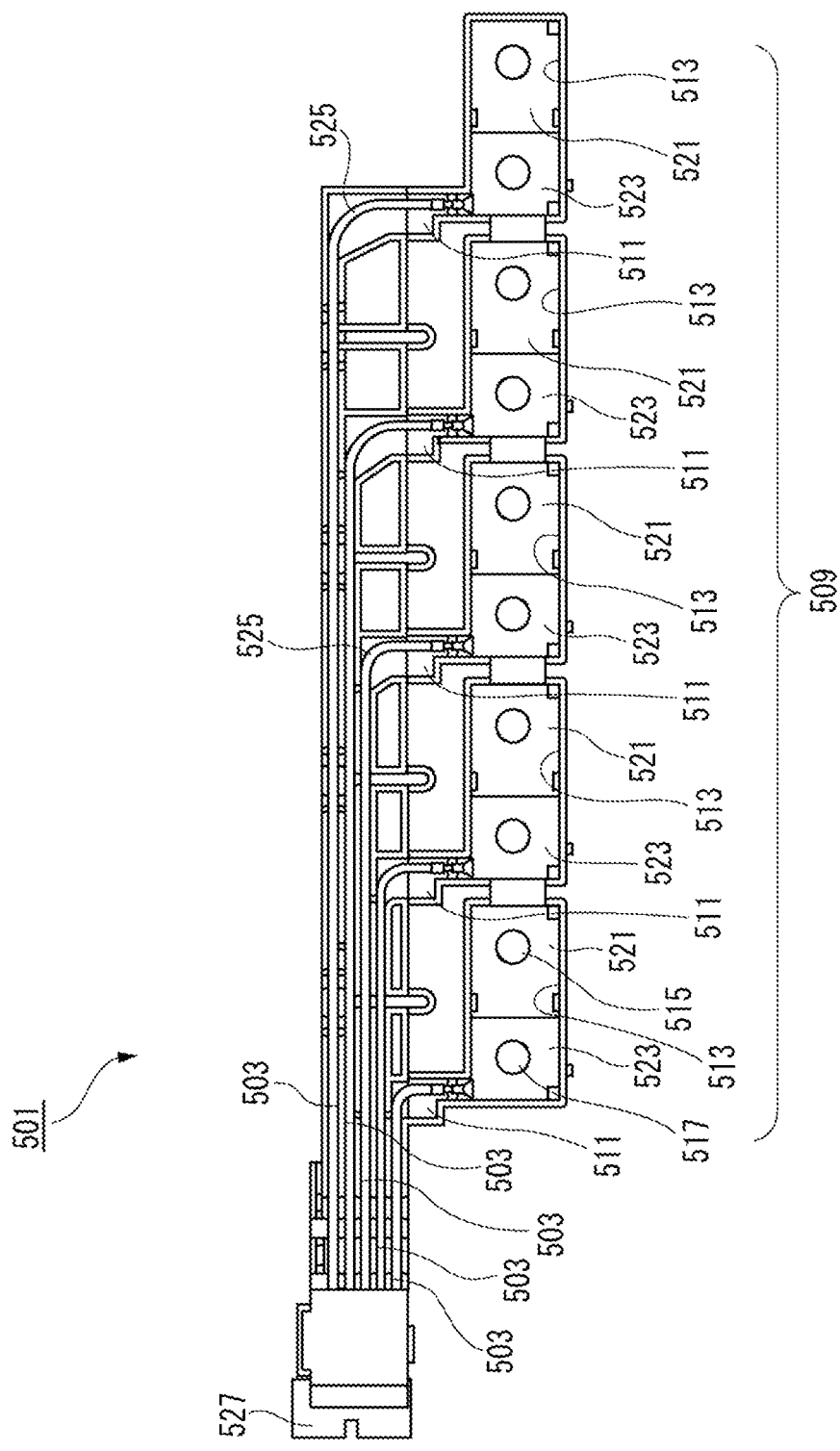
FIG. 5 is a plan view of an essential part of a conventional wire arranging device.
Figure 6:
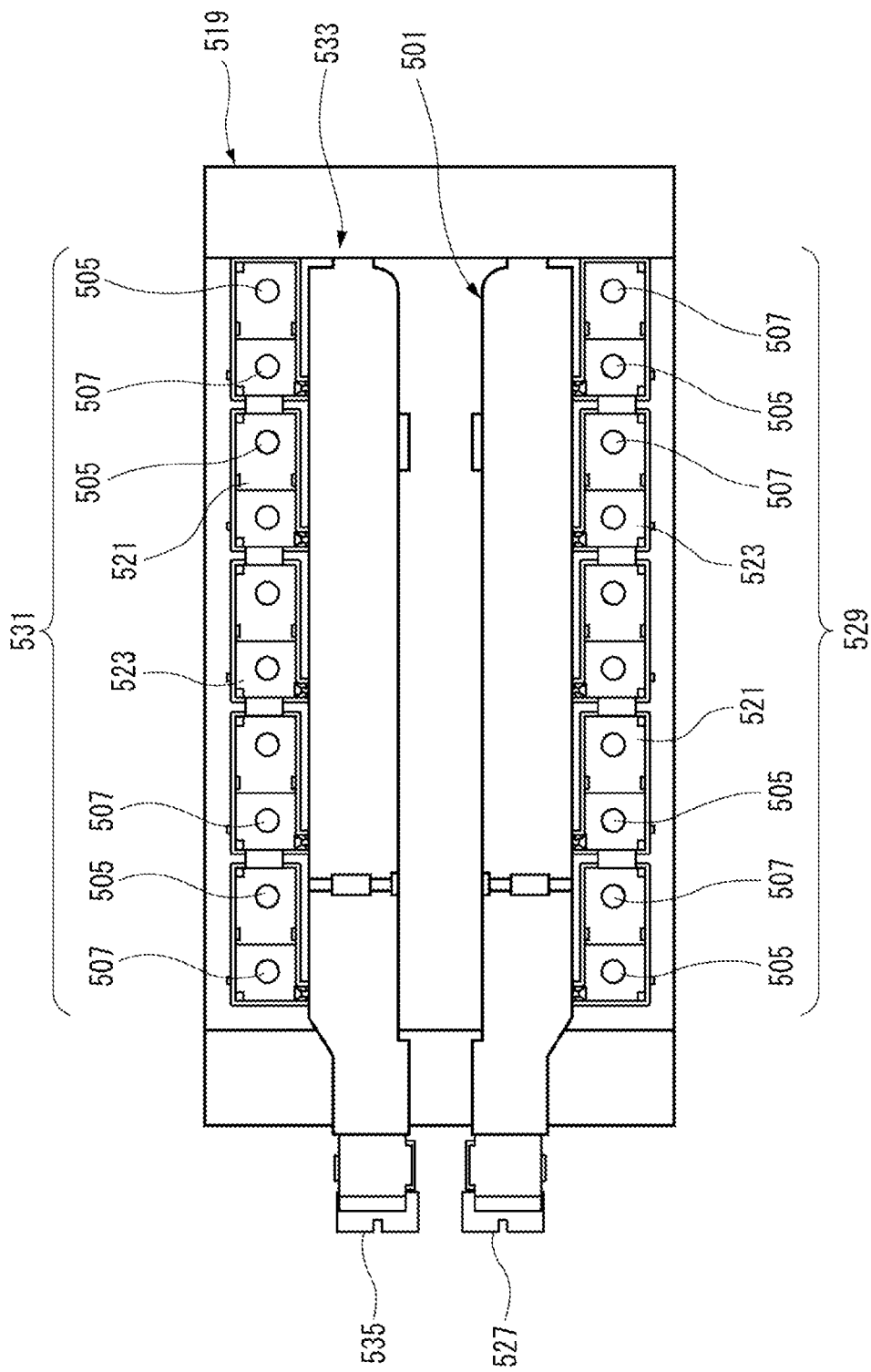
FIG. 6 is a plan view of a battery assembly on which the conventional wire arranging device is mounted.
Figure 7A:
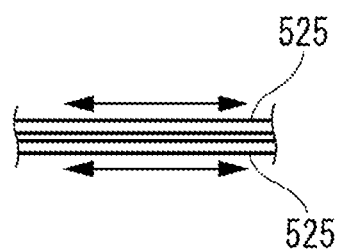
FIGS. 7A to 7C are schematic views for explaining directions in which voltage detecting wires are arranged in the conventional wire arranging device.
Figure 7B:
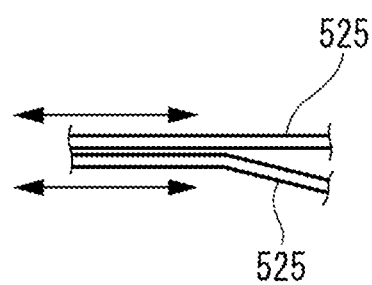
Figure 7C:
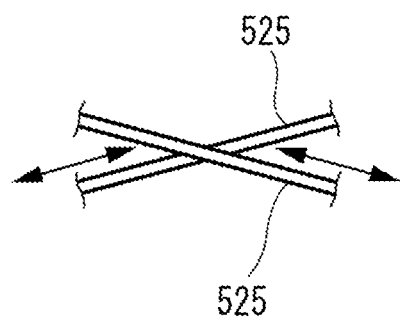

As shown in FIGS. 3 and 4, the first wires 25 and the second wires 33 which have been drawn from the wire guiding parts 57 communicated with the respective bus bar containing rooms 53 are arranged on the first tray part 21 and the second tray part 29 in parallel with each other, and without direct contacts between them, up to the first connector 23 and the second connector 31. Further, a number of partition walls 63 are uprightly provided in parallel with each other on the first tray part 21 and the second tray part 29, along a direction of arrangement of the batteries 37 from the wire guiding parts 57 to the first connector 23 and the second connector 31. Wire arranging grooves 65 are formed between these partition walls 63, and contain the first wires 25 or the second wires 33. For example, when the first wires 25 are arranged in the first case 13, the first wires 25 are guided out from the respective bus bar containing rooms 53 through the wire guiding parts 57 to be contained in the wire arranging grooves 65 of the first tray part 21, and orderly arranged up to the first connector 23, without direct contacts between them interposing the partition walls 63 which are formed in parallel with each other.

In this embodiment, the first tray part 21 is superposed on the second tray part 29, and the first connector 23 and the second connector 31 are disposed in the same plane. Therefore, an end edge 67 of the first tray part 21 in the first case 13 close to the first connector 23 is inclined downward by a height of the second tray part 29. In this manner, the first wires 25 and the second wires 33 which are guided out from the stacked first tray part 21 and second tray part 29 are connected to the first connector 23 or the second connector 31 which are disposed in the same plane, without contacts between them.

In the wire arranging device 11 according to this embodiment, a plurality of pairs of locking hooks 75 and locking parts 77 for fixing the first tray part 21 and the second tray part 29 in a stacked state are formed between the first case 13 and the second case 15 (See FIGS. 1 and 4). In this embodiment, the first case 13 is provided with a plurality of the locking hooks 75, and the second case 15 is provided with a plurality of the locking parts 77. The locking hooks 75 are suspended from both sides of the first tray part 21, at a predetermined interval along a direction where the bus bar containing rooms 53 are continued. Moreover, the locking parts 77 are provided at both sides of the second tray part 29 at a predetermined interval corresponding to the locking hooks 75, along the direction where the bus bar containing rooms 53 are continued. It is to be noted that the locking hooks 75 may be provided on the second tray part 29, and the locking parts 77 may be provided on the first tray part 21, instead of the structure in this embodiment.

Now, operation of the wire arranging device 11 having the above described structure will be described.

In order to mount the wire arranging device 11, the batteries 37 in the rectangular parallelepiped shape each having the plus terminal 41 and the minus terminal 43 are arranged in parallel and fixed, as a first step, thereby to form the battery assembly 35. On this occasion, the batteries 37 are arranged in such a manner that the plus terminal 41 of each of the batteries 37 and the minus terminal 43 of the adjacent battery are positioned close to each other, and the minus terminal 43 of this battery 37 and the plus terminal 41 of the adjacent battery are positioned close to each other.

In order to form the wire arranging device 11, the second case 15 on the lower stage is attached to the second terminal row 47, as a first step. In the second case 15, the plus terminal 41 disposed in the single bus bar containing room 55 which is provided at one end side (at a side close to the second connector) of the second row 27 of the bus bar containing rooms is passed through the terminal passing hole of the voltage detecting terminal 61 which is connected to the second wire 33, and tightened with a nut. Moreover, the minus terminal 43 disposed in the single bus bar containing room 55 which is provided at the other end side (at an opposite side to the second connector 31) of the second row 27 of the bus bar containing rooms is passed through the terminal passing hole of the voltage detecting terminal 61 which is connected to the second wire 33, and tightened with a nut.

In the second case 15, in each of the bus bar containing rooms 53 in which the minus terminal 43 and the plus terminal 41 are disposed, the minus terminal 43 is passed through the minus terminal hole 51 of the bus bar 17 which is contained in the bottom part, and the terminal passing hole of the voltage detecting terminal 61 which is superposed thereon, and at the same time, the plus terminal 41 is passed through the plus terminal hole 49, and they are tightened with nuts.

In the second terminal row 47, the minus terminal 43 of one of the batteries 37 and the plus terminal 41 of the adjacent battery are electrically connected by means of the bus bar 17, and the bus bar 17 is connected to the second wire 33. This is repeated in all the bus bar containing rooms 53 of the second row 27, except the single bus bar containing rooms 55.

In this manner, the second case 15 is attached to the second terminal row 47. Then, the first tray part 21 is superposed on the second tray part 29, and they are fixed in the stacked state, using the locking hooks 75 and the locking parts 77.

In the first case 13, the minus terminals 43 and the plus terminals 41 are disposed in all the bus bar containing rooms 53 of the first row 19. In each of the bus bar containing rooms 53, the minus terminal 43 is passed through the minus terminal hole 51 of the bus bar 17 which is contained in the bottom part, and at the same time, the plus terminal 41 is passed through the plus terminal hole 49 and the terminal passing hole of the voltage detecting terminal 61 which is superposed thereon, and they are tightened with nuts.

In the first terminal row 45, the minus terminal 43 of one of the batteries 37 and the plus terminal 41 of the adjacent battery are electrically connected by means of the bus bar 17, and the bus bar 17 is connected to the first wire 25. This is repeated in all the bus bar containing rooms 53 of the first row 19.

Finally, the first tray part 21 of the first case 13, and the first and second rows 19, 27 of the bus bar containing rooms are covered with a lid member, which is not shown, and thus, assemblage of the wire arranging device 11 is completed.

By assembling the wire arranging device 11 as described above, the respective bus bars 17 interconnecting the plus terminals 41 and the minus terminal 43 of the first terminal row 45 are connected to the first wires 25. These first wires 25 are guided out from the respective bus bar containing rooms 53 of the first row 19, and placed on the first tray part 21. A plurality of the first wires 25 which are placed on the first tray part 21 are bundled at a side of the second terminal row 47 on the first tray part 21 to be guided out from the end edge 67 of the first tray part, and can be connected to the first connector 23 which is disposed at one end side in a terminal arranging direction of the second terminal row 47.

On the other hand, the respective bus bars 17 connecting the plus terminals 41 and the minus terminal 43 of the second terminal row 47 are connected to the second wires 33. These second wires 33 are guided out from the respective bus bar containing rooms 53 of the second row 27, and placed on the second tray part 29. A plurality of the second wires 33 which are placed on the second tray part 29 are bundled at a side of the first terminal row 45 on the second tray part 29 to be guided out from an end edge 71 of the second tray part, and can be connected to the second connector 31 which is disposed at one end side in a terminal arranging direction of the first terminal row 45.

The first wires 25 guided out from the first row 19 of the bus bar containing rooms, and the second wires 33 guided out from the second row 27 of the bus bar containing rooms are respectively placed on the first tray part 21 and the second tray part 29 which are stacked on each other. Therefore, even though guiding out positions of the first wires 25 and the second wires 33 are exchanged with each other, by arranging the first wires 25 at a side of the second terminal row 47 and the second wires 33 at a side of the first terminal row 45, the wires will not intersect nor come into contact with each other.

Moreover, the first wires 25 on the first tray part 21 and the second wires 33 on the second tray part 29 are respectively contained in the wire arranging grooves 65 which are formed between the partition walls 63. As the results, it is possible to prevent intersections and contacts between the wires inside the respective tray parts.

Further, the first case 13 in which the first wires 25 are placed on the first tray part 21, and the second case 15 in which the second wires 33 are placed on the second tray part 29 are fixed to each other, as an integral body having the stacked structure, by means of the locking hooks 75 and the locking parts 77, without using an additional member. Moreover, in the second case 15 on the lower stage, the second tray part 29 is covered with the first tray part 21 on the upper stage, and hence, a lid member can be omitted.

As the results, according to the wire arranging device 11 in this embodiment, the first wires 25 connected to the first terminal row 45 and the second wires 33 connected to the second terminal row 47 can be respectively guided out toward the second terminal row 47 and toward the first terminal row 45 at the opposite sides to each other, without contacts between them.

As the results, it is possible to favorably deal with layouts of the batteries having various patterns, and structures of wiring boards for a battery monitoring unit or the like. Therefore, it is possible to select measures for cost reduction of the battery assembly 35 from a wide range of choice.

It is to be noted that the wire arranging device according to the invention is not limited to the above described embodiment, but various modifications, improvements, and so on can be appropriately made. Further, materials, shapes, sizes, numbers, positions to be disposed, etc. of constituent elements in the above described embodiment are not limited, but can be optionally selected.

The present invention is useful for providing a wire arranging device which can favorably deal with layouts of the batteries having various patterns, and structures of wiring boards for a battery monitoring unit or the like, and can select measures for cost reduction of the battery assembly from a wide range of choice.

What is claimed is:

1. A wire arranging device, comprising
   a plurality of bus bars for interconnecting plus terminals and minus terminals of batteries which are alternately disposed in a pair of a first terminal row and a second terminal row arranged in parallel with each other, each of the bus bars interconnecting a set of the plus terminal of each of the batteries and the minus terminal of the adjacent battery,
   a first row of bus bar containing rooms and a second row of bus bar containing rooms in which the bus bar containing rooms are continued, the bus bar containing rooms being defined to respectively contain the bus bars,
   a first tray part and a second tray part which are respectively connected to the first row of the bus bar containing rooms and the second row of the bus bar containing rooms, and stacked on each other,
   a plurality of first wires, wherein one ends of the first wires are respectively connected to the bus bars of the first row of the bus bar containing rooms and placed on the first tray part, while the other ends of the first wires are guided out toward one end side in a terminal arranging direction of the second terminal row and connected to a first connector, and
   a plurality of second wires, wherein one ends of the second wires are respectively connected to the bus bars of the second row of the bus bar containing rooms and placed on the second tray part, while the other ends of the second wires are guided out toward one end side in a terminal arranging direction of the first terminal row and connected to a second connector.

2. The wire arranging device as claimed in claim 1, wherein partition walls for forming wire arranging grooves for the first wires are uprightly provided on the first tray part, and partition walls for forming wire arranging grooves for the second wires are uprightly provided on the second tray part.

3. The wire arranging device as claimed in claim 1, wherein
   the first row of the bus bar containing rooms and the first tray part are assembled to form a first case,
   the second row of the bus bar containing rooms and the second tray part are assembled to form a second case, and
   a plurality of pairs of locking hooks and locking parts for fixing the first tray part and the second tray part in a stacked state are provided between the first case and the second case.

\* \* \* \* \*